US007681552B2

(12) United States Patent
Kaneko et al.

(10) Patent No.: US 7,681,552 B2
(45) Date of Patent: Mar. 23, 2010

(54) INTERNAL COMBUSTION ENGINE KNOCK DETERMINATION DEVICE AND KNOCK DETERMINATION METHOD

(75) Inventors: Rihito Kaneko, Nishikamo-gun (JP); Kenji Kasashima, Nishikamo-gun (JP); Masatomo Yoshihara, Toyota (JP); Kenji Senda, Okazaki (JP); Norihito Hanai, Toyota (JP); Yasuhiro Yamasako, Toyota (JP); Shuhei Oe, Kariya (JP); Yuichi Takemura, Anjo (JP)

(73) Assignees: Toyota Jidosha Kabushiki Kaisha, Toyota (JP); Denso Corporation, Kariya (JP); Nippon Soken, Inc., Nishio (JP)

( * ) Notice: Subject to any disclaimer, the term of this patent is extended or adjusted under 35 U.S.C. 154(b) by 62 days.

(21) Appl. No.: 12/092,004

(22) PCT Filed: Oct. 1, 2007

(86) PCT No.: PCT/JP2007/069540

§ 371 (c)(1),
(2), (4) Date: Apr. 29, 2008

(87) PCT Pub. No.: WO2008/044622

PCT Pub. Date: Apr. 17, 2008

(65) Prior Publication Data
US 2008/0294328 A1 Nov. 27, 2008

(30) Foreign Application Priority Data
Oct. 3, 2006 (JP) .............................. 2006-272036

(51) Int. Cl.
*F02P 5/00* (2006.01)
*G01L 23/22* (2006.01)

(52) U.S. Cl. ............................ 123/406.29; 123/406.34; 73/35.01; 73/35.09
(58) Field of Classification Search ............ 123/406.29, 123/406.33–406.39; 73/35.01, 35.03, 35.06, 73/35.09
See application file for complete search history.

(56) References Cited

U.S. PATENT DOCUMENTS 4,240,388 A * 12/1980 Omori et al. ............ 123/406.35
4,268,910 A *  5/1981 Omori et al. ................ 701/111
4,777,920 A * 10/1988 Oshiage et al. ......... 123/406.37

(Continued)

FOREIGN PATENT DOCUMENTS

JP          4 66753          3/1992

(Continued)

*Primary Examiner*—John T Kwon
(74) *Attorney, Agent, or Firm*—Oblon, Spivak, McClelland, Maier & Neustadt, L.L.P.

(57) ABSTRACT

An engine ECU executes a program including: the step of increasing a determination value by a correction amount if the number of knock intensities not lower than the determination value is not smaller than a threshold value among knock intensities of a plurality of predetermined number of continuous ignition cycles; and the step of increasing the determination value by a correction amount if the number of knock intensities not smaller than the determination value is not smaller than a threshold value, among knock intensities of a plurality of ignition cycles satisfying the condition that a coefficient of correlation calculated by comparing a vibration waveform and a knock waveform model is not smaller than a threshold value, of the knock intensities of a plurality of predetermined continuous ignition cycles.

18 Claims, 14 Drawing Sheets

U.S. PATENT DOCUMENTS

| | | | |
|---|---|---|---|
| 7,478,624 B2 * | 1/2009 | Kaneko et al. | 123/406.37 |
| 2006/0288982 A1 * | 12/2006 | Kaneko et al. | 123/406.39 |

FOREIGN PATENT DOCUMENTS

| | | |
|---|---|---|
| JP | 4 76249 | 3/1992 |
| JP | 7 301582 | 11/1995 |
| JP | 2003 21032 | 1/2003 |
| JP | 2006 307711 | 11/2006 |

\* cited by examiner

FIG. 7

|       | NE(1) | NE(2) |       |
|-------|-------|-------|-------|
| KL(2) | A | C | B |
|       | B | C | B |
| KL(1) | A | B | A |

AMOUNT OF INTAKE AIR KL

ENGINE SPEED NE

F I G. 8
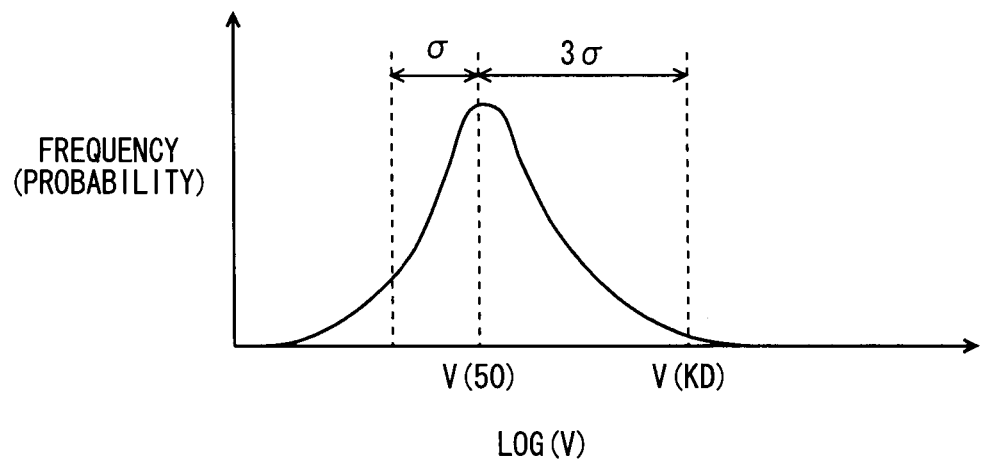
F I G. 9
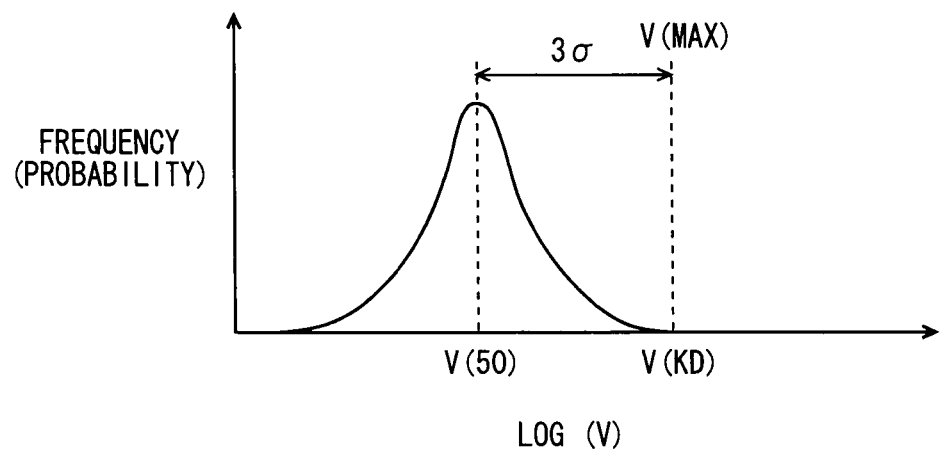

F I G. 1 0
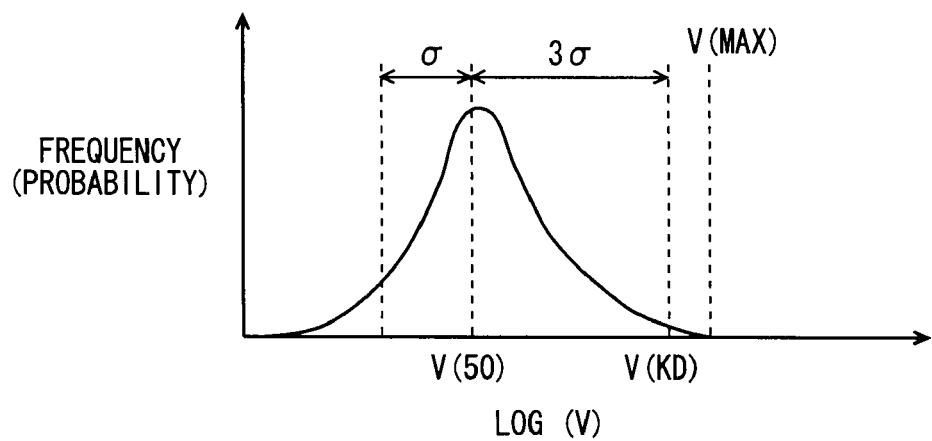
F I G. 1 1
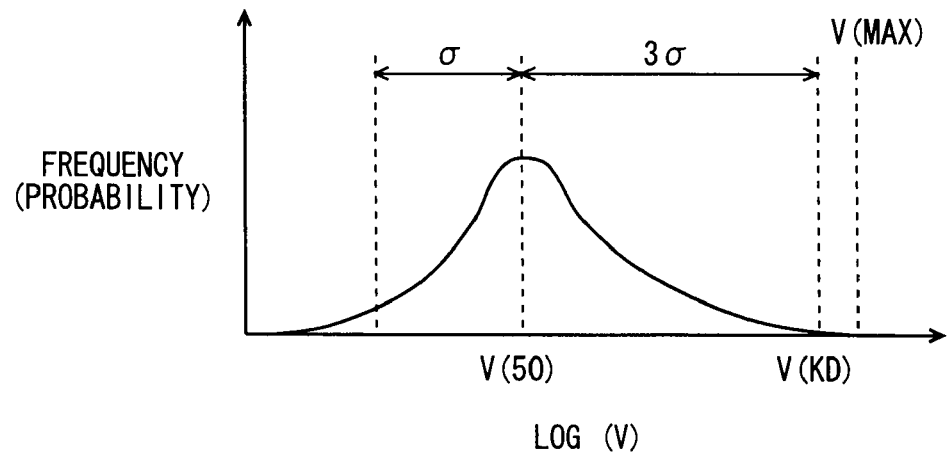

INTERNAL COMBUSTION ENGINE KNOCK DETERMINATION DEVICE AND KNOCK DETERMINATION METHOD

TECHNICAL FIELD

The present invention relates to determination of knocking that occurs in an internal combustion engine and, more specifically, to knock determination based on vibration intensity and vibration waveform of the internal combustion engine.

BACKGROUND ART

Conventionally, various methods of detecting knocking (knock) of an internal combustion engine have been known. By way of example, a technique has been known which determines that knock has occurred when vibration intensity of an internal combustion engine is above a threshold value. It is possible, however, that noise such as vibration experienced when an intake valve or an exhaust valve is closed has intensity higher than the threshold value, while knocking does not occur. This may leads to an erroneous determination that knock has occurred, though knock has not occurred. Therefore, techniques for determining presence/absence of knocking based on vibration waveform to take into consideration characteristics other than the intensity, such as crank angle at which vibration occurs or attenuation factor have been proposed.

Japanese Patent Laying-Open No. 2003-021032 discloses a knock control device for an internal combustion engine, including a knock sensor for detecting knocking of the internal combustion engine, a statistical processing unit for statistically processing an output signal detected by the knock sensor, a first temporary determining unit for determining knock occurrence based on the result of processing by the statistical processing unit, a second temporary determining unit for determining knock occurrence based on the waveform of the output signal detected by the knock sensor, and a final knock determining unit for finally determining knock occurrence based on the temporary knock determination by the first temporary determining unit and the temporary knock determination by the second temporary determining unit. The final knock determining unit finally determines that knock has occurred, if both the first and second temporary determining units determined that knock has occurred. In the first temporary determining unit, whether knock has occurred or not is determined by comparing the maximum value of the output signal detected by the knock sensor with a knock determination level (determination value) calculated based on the result of processing by the statistical processing unit. Based on the frequency of knock occurrence, the determination value is corrected to a value obtained by subtracting a set value ΔV from the determination value, or to a value obtained by adding a product of a value A larger than "1" and the set value ΔV to the determination value.

Now, as in the knock control device described in Japanese Patent Laying-Open No. 2003-021032, if vibration caused by knocking and noise are used not distinguished from each other in correcting the determination value used for determining presence/absence of knocking, the determination value would possibly be corrected inappropriately, as the noise intensity is comparable to the vibration intensity caused by knocking. Correction of the determination value with the noise removed may be possible. If the determination value were corrected with noise removed, however, data necessary for correcting the determination value would be insufficient. This possibly leads to delayed correction of the determination value.

DISCLOSURE OF THE INVENTION

An object of the present invention is to provide a knock determination device and a knock determination method for an internal combustion engine that can quickly and accurately correct the determination value.

According to an aspect, the present invention provides a knock determination device for an internal combustion engine, including a knock sensor detecting vibration intensity of the internal combustion engine in an interval of predetermined crank angles, and an operation unit. The operation unit detects a waveform of vibration of the internal combustion engine based on the vibration intensity of the internal combustion engine, calculates a first value corresponding to the vibration intensity of the internal combustion engine, calculates, based on a result of comparison between the detected waveform and a predetermined waveform model as a reference waveform of vibration in the internal combustion engine, a second value corresponding to a difference between the detected waveform and the waveform model, determines whether or not knock has occurred in the internal combustion engine based on a result of comparison between the first value and a predetermined first determination value, and based on a result of comparison between the second value and a predetermined second determination value, corrects the first determination value if the number of first values not lower than the first determination value is not smaller than a first number, among the first values calculated in a plurality of predetermined number of continuous ignition cycles, and corrects the first determination value if the number of first values not lower than the first determination value is not smaller than a second number, among the first values calculated in a plurality of ignition cycles in which the second value satisfies a predetermined condition.

In this arrangement, vibration intensity of the internal combustion engine is detected in a predetermined crank angle interval. Based on the vibration intensity of the internal combustion engine, a waveform of vibration in the internal combustion engine is detected. Further, a first value corresponding to the vibration intensity of the internal combustion engine is calculated. Based on a result of comparison between the detected waveform and a predetermined waveform model as a reference vibration waveform of the internal combustion engine, a second value corresponding to the difference between the detected waveform and the waveform model is calculated. Based on the result of comparison between the first value and a predetermined first determination value and based on the result of comparison between the second value and a predetermined second determination value, whether knock has occurred in the internal combustion engine or not is determined. Accordingly, it becomes possible to determine whether knock has occurred or not taking into consideration both the vibration intensity and vibration waveform. It is noted that the vibration intensity generated in the internal combustion engine is not always constant. For instance, dependent on driving conditions or aging of a knock sensor, the detected vibration intensity may vary. Therefore, it is necessary to correct the determination value used for determining whether knock has occurred or not. Accordingly, the first determination value is corrected if the number of first values that are not lower than the first determination value is not smaller than a first number among the first values calculated in a plurality of predetermined number of continuous ignition cycles. Therefore, regardless of the difference between the vibration waveform and the waveform model, the first determination value can be corrected if the number of first values that are not lower than the first determination value is large. In other words, no matter whether the vibration comes from knocking or noise, the first determination value can be corrected if the first determination value is considered too small as compared with the vibration intensity experienced in the internal combustion engine. Thus, the first determination value can be corrected quickly. Now, noise intensity is relatively high and, therefore, even if the first determination value is not so small, the number of first values that are not lower than the first determination value may possibly become large. Therefore, the first determination value is corrected if the number of first values that are not lower than the first determination value is larger than a second number, among the first values calculated in a plurality of ignition cycles in which the second value corresponding to the difference between the detected waveform and the waveform model satisfies a predetermined condition. Accordingly, the first determination value can be corrected if the first determination value is small as compared with the first values except for the first values calculated in ignition cycles in which the difference between the detected waveform and the waveform model is large, that is, the ignition cycles that involve noise. Thus, it becomes possible to correct the determination value with high accuracy, removing the influence of noise. As a result, the determination value can be corrected quickly with high accuracy.

Preferably, if the number of first values not lower than the first determination value is not smaller than the first number among the first values calculated in the plurality of predetermined number of continuous ignition cycles, the operation unit corrects the first determination value by a correction amount larger than when the number of first values not lower than the first determination value is not smaller than the second number among the first values calculated in the plurality of ignition cycles in which the second value satisfies the predetermined condition.

In this arrangement, if the number of first values that are not lower than the first determination value is not smaller than the first number, among the first values calculated in a plurality of predetermined number of continuous ignition cycles, the first determination value is corrected with a larger amount of correction, than when the number of first values not lower than the first determination value is not smaller than the second number, among the first values calculated in the plurality of ignition cycles in which the second value satisfies the condition. Therefore, if the first determination value is considered too small as compared with the vibration intensity generated in the internal combustion engine, the first determination value can be corrected by a larger amount. Thus, it is possible to quickly correct the first determination value.

More preferably, the operation unit corrects the first determination value by a larger correction amount when the number of first values not lower than the first determination value becomes larger among the first values calculated in the plurality of predetermined number of continuous ignition cycles.

In this arrangement, the larger the number of the first values not lower than the first determination value among the first values calculated in the plurality of predetermined number of continuous ignition cycles, the larger the amount of correction with which the first determination value is corrected. Therefore, if the first determination value is considered too small as compared with the vibration intensity experienced in the internal combustion engine, the first determination value can be corrected by a larger amount. Thus, it is possible to quickly correct the first determination value.

More preferably, the operation unit corrects the first determination value if the number of first values not lower than the first determination value is not smaller than the second number among the first values calculated in the plurality of ignition cycles in which the second value satisfies the condition and the number of first values not lower than the first determination value is smaller than the first number among the first values calculated in the plurality of predetermined number of continuous ignition cycles.

In this arrangement, only when the first determination value is not corrected based on the first values calculated in the predetermined number of continuous ignition cycles, the first determination value is corrected based on the first values calculated in a plurality of ignition cycles in which the second value satisfies the condition. Therefore, accumulative correction of the first determination value can be prevented.

More preferably, the operation unit corrects the first determination value if ratio of intensities larger than a third determination value calculated based on vibration intensity in the internal combustion engine among the vibration intensities detected in a plurality of ignition cycles is larger than a predetermined ratio, corrects the first determination value if the ratio of intensities larger than the third determination value among the vibration intensities detected in the plurality of ignition cycles is smaller than the predetermined ratio and it is determined that knock has occurred in the internal combustion engine, and corrects the first determination value if the number of first values not lower than the first determination value is not smaller than the first number among the first values calculated in the plurality of predetermined number of continuous ignition cycles and if the ratio of intensities larger than the third determination value among the vibration intensities detected in the plurality of ignition cycles is smaller than the predetermined ratio.

In this arrangement, the first determination value is corrected if the ratio of intensities larger than the third determination value calculated based on the vibration intensity of the internal combustion engine among the vibration intensities detected in a plurality of ignition cycles is higher than a predetermined ratio. Therefore, it becomes possible to correct the first determination value when frequency of knocking is high. Even if correction is not done based on the ratio of intensities higher than the third determination value, the first determination value is corrected if it is determined that knock has occurred in the internal combustion engine. Therefore, the first determination value can reliably be corrected if knock occurs. The first determination value is corrected based on the first values calculated in a plurality of predetermined number of continuous ignition cycles only if the first determination value is not corrected based on the ratio of intensities higher than the third determination value. Therefore, when the first determination value is corrected based on the ratio of intensities larger than the third determination value, accumulative correction can be prevented.

More preferably, the second value is calculated to be larger if difference between the detected waveform and the waveform model is smaller, and the condition is that it is not smaller than a predetermined value.

In this arrangement, the second value is calculated to be larger when the difference between the detected waveform and the waveform model is smaller. If the number of first values not lower than the first determination value among the first values calculated in a plurality of ignition cycles satisfying the condition that the second value is not smaller than the predetermined value is not smaller than the second number, the first determination value is corrected. Consequently, if the first determination value is considered small as compared with the first values excluding the first value calculated in the ignition cycle in which the difference between the detected waveform and the waveform model is large, that is, ignition cycles involving noise, the first determination value can be corrected. Therefore, the determination value can be corrected with high accuracy, removing the influence of noise.

BRIEF DESCRIPTION OF THE DRAWINGS

FIG. 7 shows a map of determination value V(J) stored in an ROM or an SRAM of engine ECU.

FIG. 8 is a (first) diagram representing frequency distribution of intensity value LOG(V).

FIG. 9 is a (second) diagram representing frequency distribution of intensity value LOG(V).

FIG. 10 is a (third) diagram representing frequency distribution of intensity value LOG(V).

FIG. 11 is a (fourth) diagram representing frequency distribution of intensity value LOG(V).

BEST MODES FOR CARRYING OUT THE INVENTION

Figure 1:
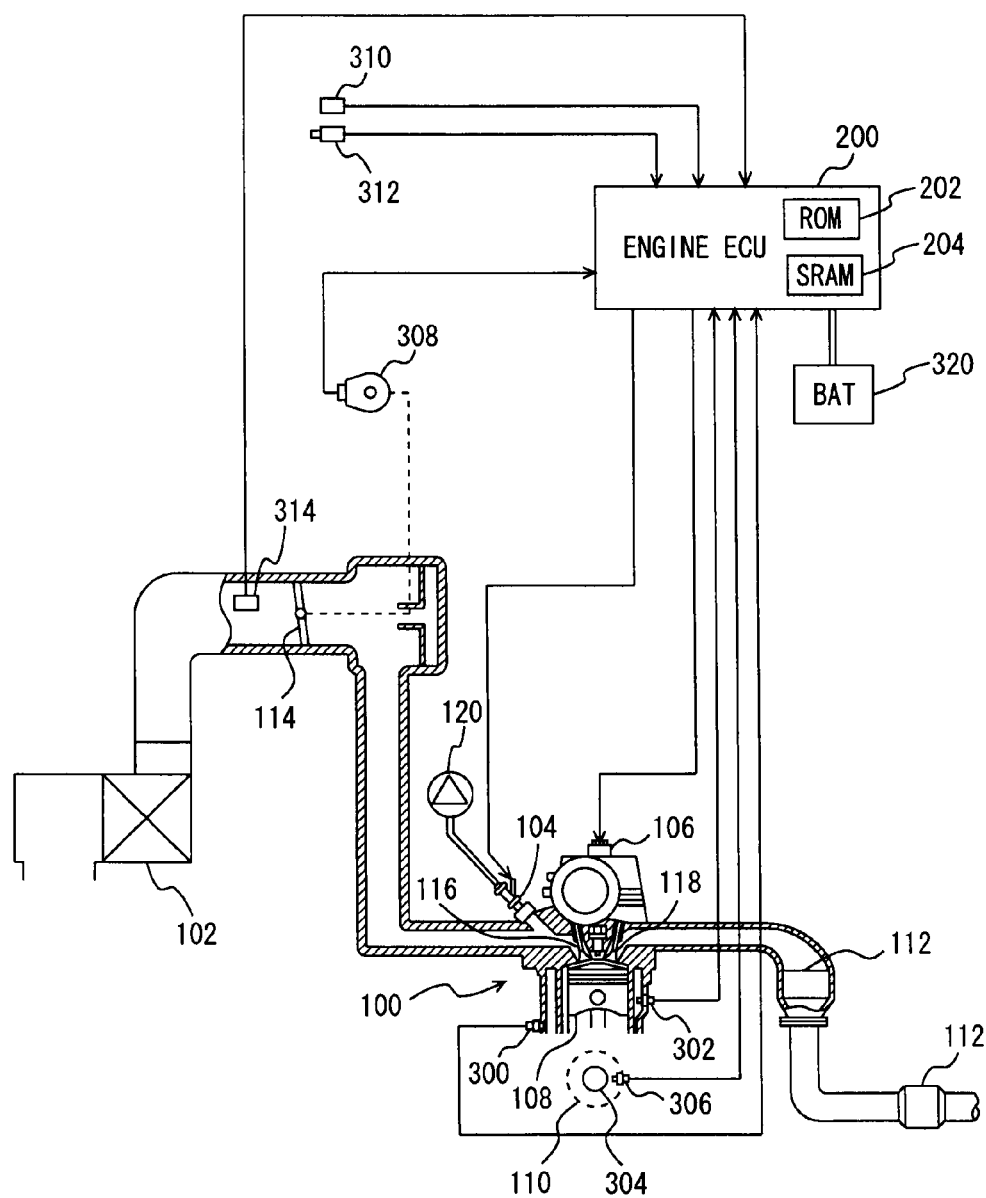
FIG. 1 is a schematic configuration diagram showing an engine controlled by an engine ECU as a knock determination device in accordance with an embodiment of the present invention.

Embodiments of the present invention will be described in the following with reference to the figures. In the following description, the same components are denoted by the same reference characters. The names and functions are also the same. Therefore, detailed description thereof will not be repeated.

Referring to FIG. 1, an engine 100 of a vehicle mounting the knock determination device in accordance with an embodiment of the present invention will be described. Engine 100 is provided with a plurality of cylinders. The knock determination device in accordance with the present embodiment is realized by executing a program stored, for example, in an ROM (Read Only Memory) 202 of an engine ECU (Electronic Control Unit) 200.

Engine 100 is an internal combustion engine, in which a mixture of air taken through an air cleaner 102 and a fuel injected by an injector 104 is ignited by a spark plug 106 and burned in a combustion chamber. Though timing of ignition is adjusted to attain MBT (Minimum advance for Best Torque) to maximize output torque, it is advanced or retarded in accordance with the state of operation of engine 100 when, for example, knocking occurs.

The burning of air-fuel mixture causes combustion pressure that presses a piston 108 down, whereby a crankshaft 110 rotates. The combusted air-fuel mixture (or exhaust gas) is purified by a three-way catalyst 112 and thereafter discharged outside the vehicle. The amount of air taken into engine 100 is adjusted by a throttle valve 114.

Engine 100 is controlled by engine ECU 200 having connected thereto a knock sensor 300, a water temperature sensor 302, a crank position sensor 306 arranged opposite to a timing rotor 304, a throttle open position sensor 308, a vehicle speed sensor 310, an ignition switch 312 and an air flow meter 314.

A knock sensor 300 is provided in a cylinder block of engine 100. Knock sensor 300 is implemented by a piezoelectric element. As engine 100 vibrates, knock sensor 300 generates a voltage having a magnitude corresponding to that of the vibration. Knock sensor 300 transmits a signal representing the voltage to engine ECU 200. Water temperature sensor 302 detects temperature of cooling water in engine 100 at a water jacket and transmits a signal representing a resultant detection to engine ECU 200.

Timing rotor 304 is provided at crankshaft 110 and rotates together with crankshaft 110. Timing rotor 304 is circumferentially provided with a plurality of protrusions spaced by a predetermined distance. Crank position sensor 306 is arranged opposite to the protrusions of timing rotor 304. When timing rotor 304 rotates, an air gap between the protrusions of timing rotor 304 and crank position sensor 306 varies, so that magnetic flux passing through a coil portion of crank position sensor 306 increases/decreases, thus generating electromotive force. Crank position sensor 306 transmits a signal representing the electromotive force to engine ECU 200. From the signal transmitted from crank position sensor 306, engine ECU 200 detects a crank angle and rotation number of crankshaft 110.

Throttle open position sensor 308 detects a throttle open position and transmits a signal representing a resultant detection to engine ECU 200. Vehicle speed sensor 310 detects number of rotations of a wheel (not shown) and transmits a signal representing a resultant detection to engine ECU 200. From the number of rotations of the wheel, engine ECU 200 calculates the vehicle speed. Ignition switch 312 is turned on by a driver, for starting engine 100. Air flow meter 314 detects amount of air taken into engine 100, and transmits a signal representing a resultant detection to engine ECU 200.

Engine ECU 200 operates with electric power fed from an auxiliary battery 320. Engine ECU 200 uses the signals transmitted from various sensors and ignition switch 312 as well as maps and programs stored in ROM 202 and an SRAM (Static Random Access Memory) 204 to perform an operation to control equipment so that engine 100 attains a desired driving condition.

In the present embodiment, using a signal transmitted from knock sensor 300 and a crank angle, engine ECU 200 detects a waveform of vibration (hereinafter referred to as "vibration waveform") of engine 100 at a predetermined knock detection gate (a section from a predetermined first crank angle to a predetermined second crank angle) and from the detected vibration waveform determines whether knock has occurred in engine 100. The knock detection gate of the present embodiment is from the top dead center (0°) to 90° in a combustion stroke. It is noted that the knock detection gate is not limited thereto. The knock detection gate corresponds to the first range of the first invention described above.

Figure 2:
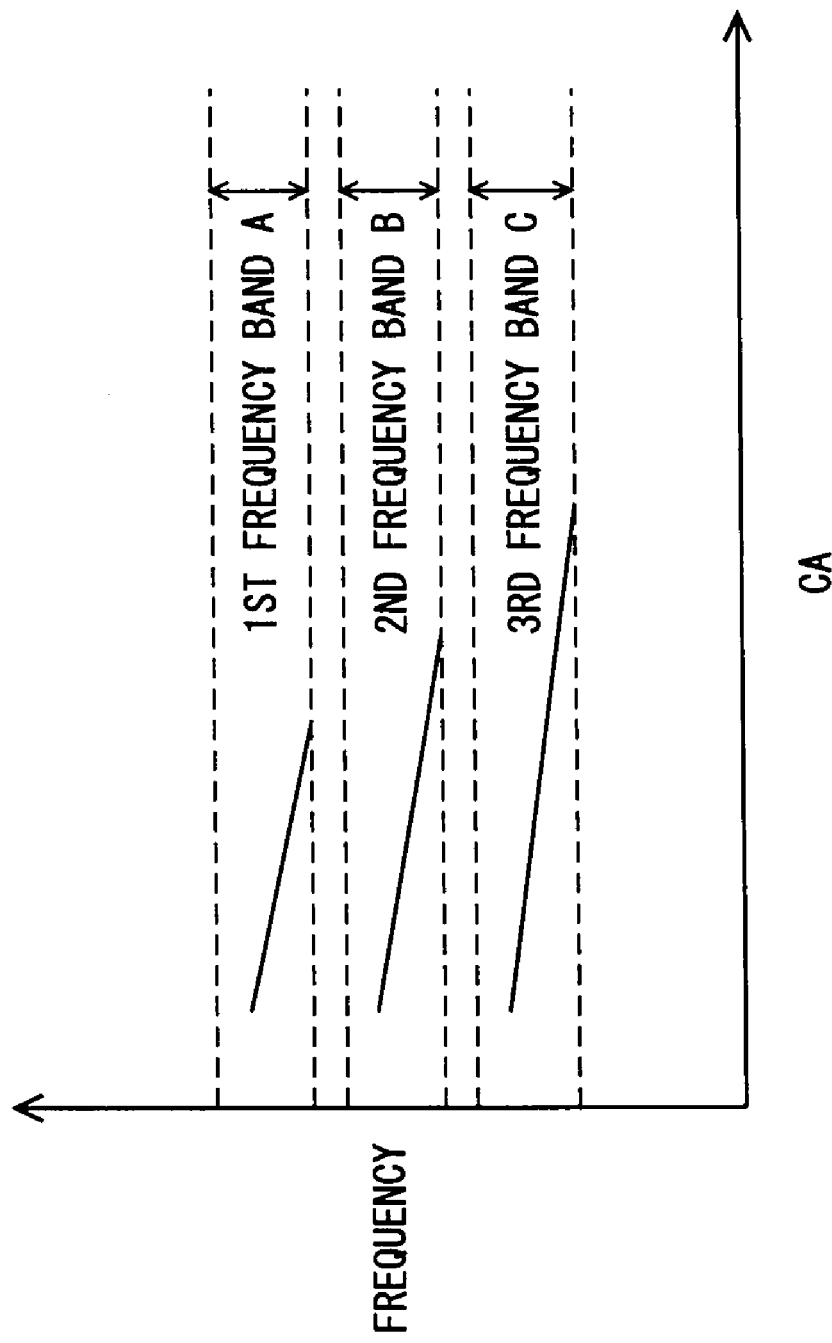
FIG. 2 shows frequency bands of vibrations generated in the engine when knock occurs.

When the engine knocks, vibrations occur in engine 100 at frequencies around the frequencies represented by solid lines in FIG. 2. The frequency of vibration caused by knocking is not constant but has a prescribed bandwidth. Therefore, in the present embodiment, vibrations at frequencies included in a first frequency band A, a second frequency band B, and a third frequency band C are detected, as shown in FIG. 2. In FIG. 2, CA represents crank angle. The number of frequency bands including the frequencies of a vibration attributed to knocking is not limited to three.

Figure 3:
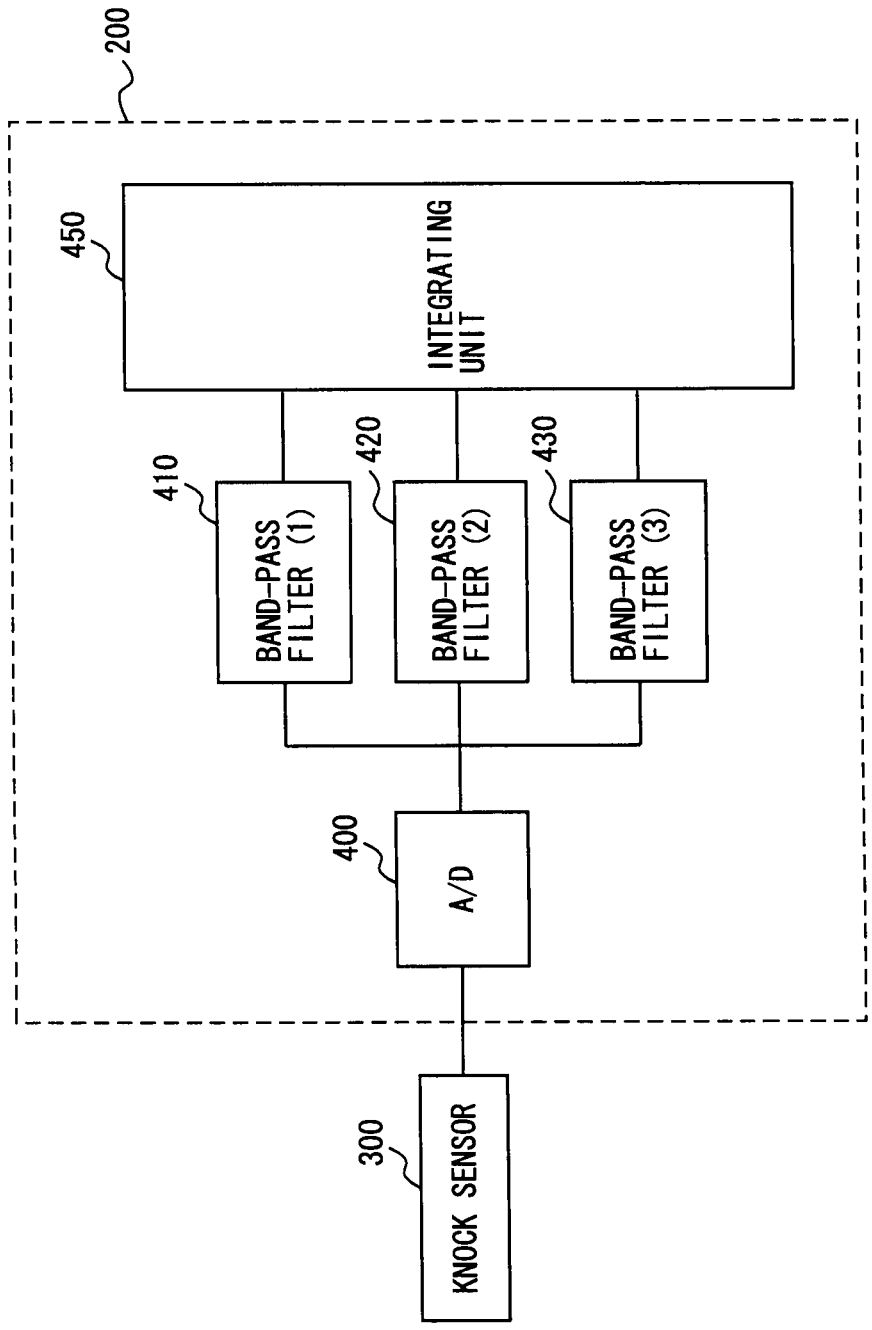
FIG. 3 is a control block diagram showing the engine ECU of FIG. 1.

Referring to FIG. 3, engine ECU 200 will be described. Engine ECU 200 includes an A/D (analog/digital) converting unit 400, a band-pass filter (1) 410, a band-pass filter (2) 420, a band-pass filter (3) 430, and an integrating unit 450.

A/D converting unit 400 converts an analog signal transmitted from knock sensor 300 to a digital signal. Band-pass filter (1) 410 passes only the signal in the first frequency band A of the signals transmitted from knock sensor 300. Specifically, of the vibrations detected by knock sensor 300, only the vibrations in the first frequency band A are extracted by band-pass filter (1) 410.

Band-pass filter (2) 420 passes only the signal in the second frequency band B of the signals transmitted from knock sensor 300. Specifically, of the vibrations detected by knock sensor 300, only the vibrations in the second frequency band B are extracted by band-pass filter (2) 420.

Band-pass filter (3) 430 passes only the signal in the third frequency band C of the signals transmitted from knock sensor 300. Specifically, of the vibrations detected by knock sensor 300, only the vibrations in the third frequency band C are extracted by band-pass filter (3) 430.

Integrating unit 450 integrates the signals selected by band-pass filter (1) 410 to band-pass filter (3) 430, that is, vibration intensities, five degrees by five degrees of the crank angle. In the following, the value integrated in this manner will be denoted as the integrated value. Calculation of the integrated value is done for each frequency band. Calculation of the integrated value realizes detection of frequency waveform in each frequency band.

Further, the thus calculated 5-degrees integrated values of the first frequency band A to the third frequency band C are added in correspondence with the crank angle. Specifically, vibration waveforms of the first frequency band A to the third frequency band C are combined.

Figure 4:
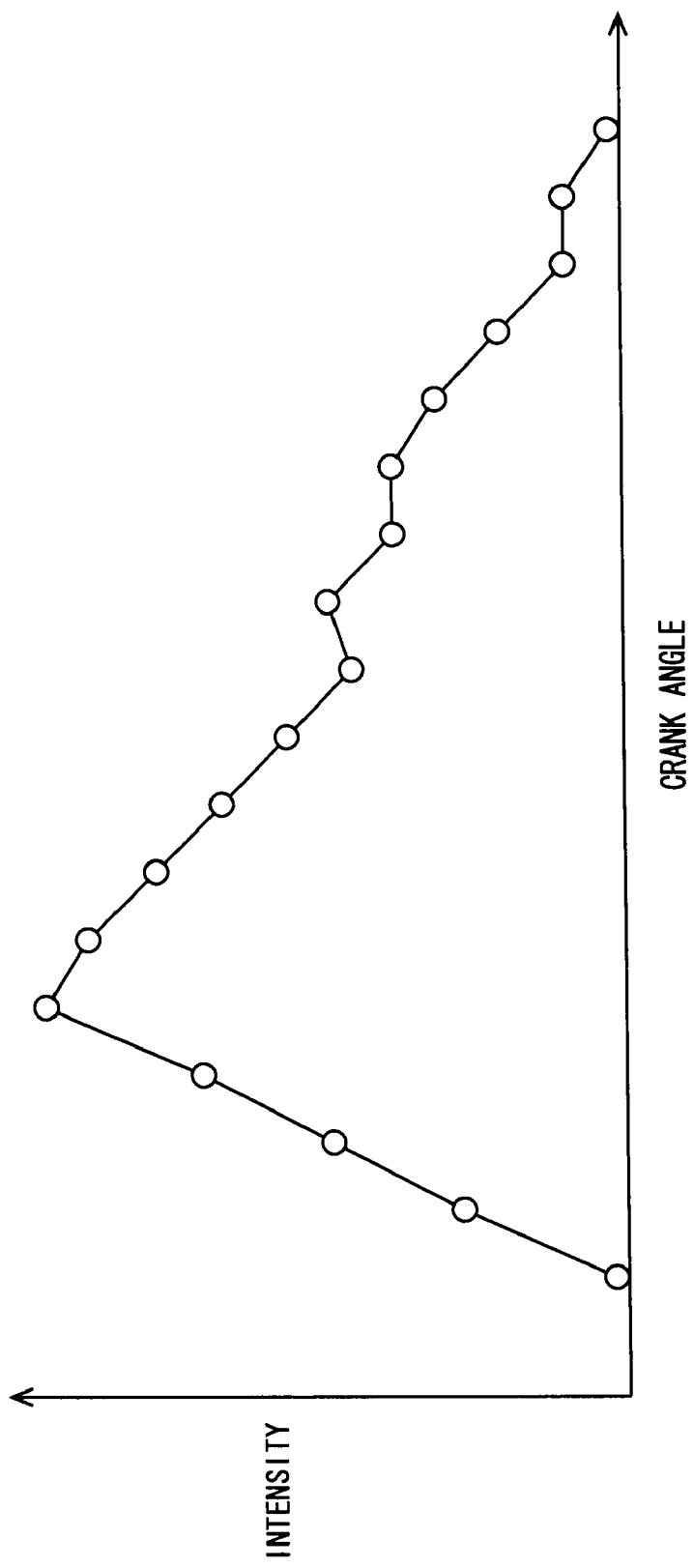
FIG. 4 shows an engine vibration waveform.

Consequently, the vibration waveform of engine 100 is detected as shown in FIG. 4. The combined waveform of the first to third frequency bands A to C is used as the vibration waveform of engine 100.

Figure 5:
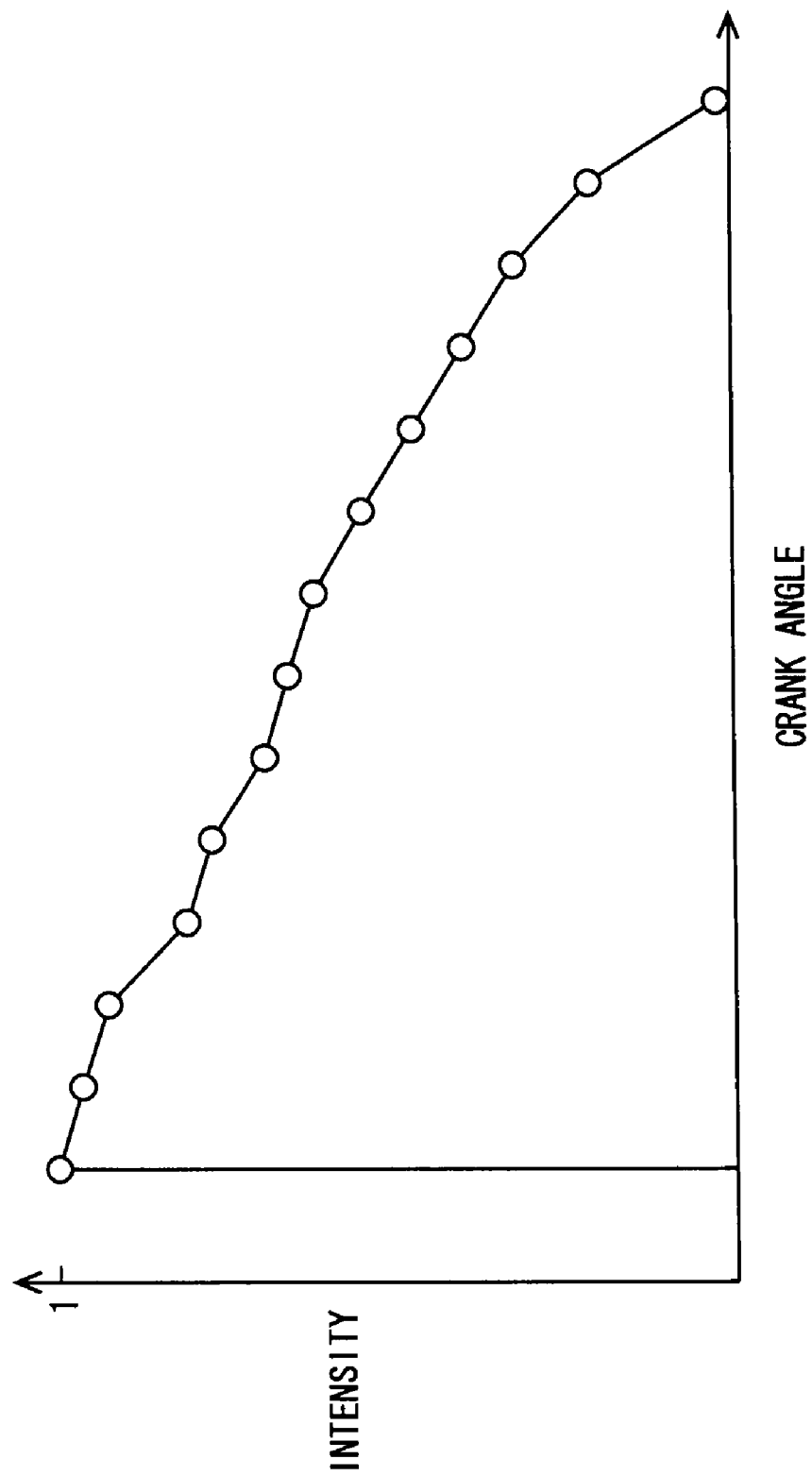
FIG. 5 shows a knock waveform model stored in an ROM of the engine ECU.

The detected vibration waveform is compared with the knock waveform model stored in ROM 202 of engine ECU 200 as shown in FIG. 5. The knock waveform model is formed in advance as a model vibration waveform when engine 100 knocks.

In the knock waveform model, magnitude of vibration is represented by a dimensionless number of 0 to 1 and does not uniquely correspond to a crank angle. More specifically, for the knock waveform model of the present embodiment, while it is determined that the vibration intensity decreases as the crank angle increases after the peak value of vibration intensity, the crank angle at which the vibration intensity assumes the peak value is not determined.

The knock waveform model of the present embodiment corresponds to the vibration after the peak intensity of vibration generated by knocking. A knock waveform model that corresponds to vibration after the rise of vibration caused by knocking may be stored.

The knock waveform model is formed and stored in advance based on a vibration waveform of engine 100 detected when knocking is forced by an experiment or the like.

The knock waveform model is formed by using an engine 100 (hereinafter referred to as central characteristic engine) of which size and output value of knock sensor 300 are the central values of size tolerance and output tolerance of knock sensor 300. In other words, the knock waveform model is the vibration waveform obtained when knocking is forced in the central characteristic engine. The method of forming the knock waveform model is not limited thereto, and it may be formed, by way of example, by simulation.

Figure 6:
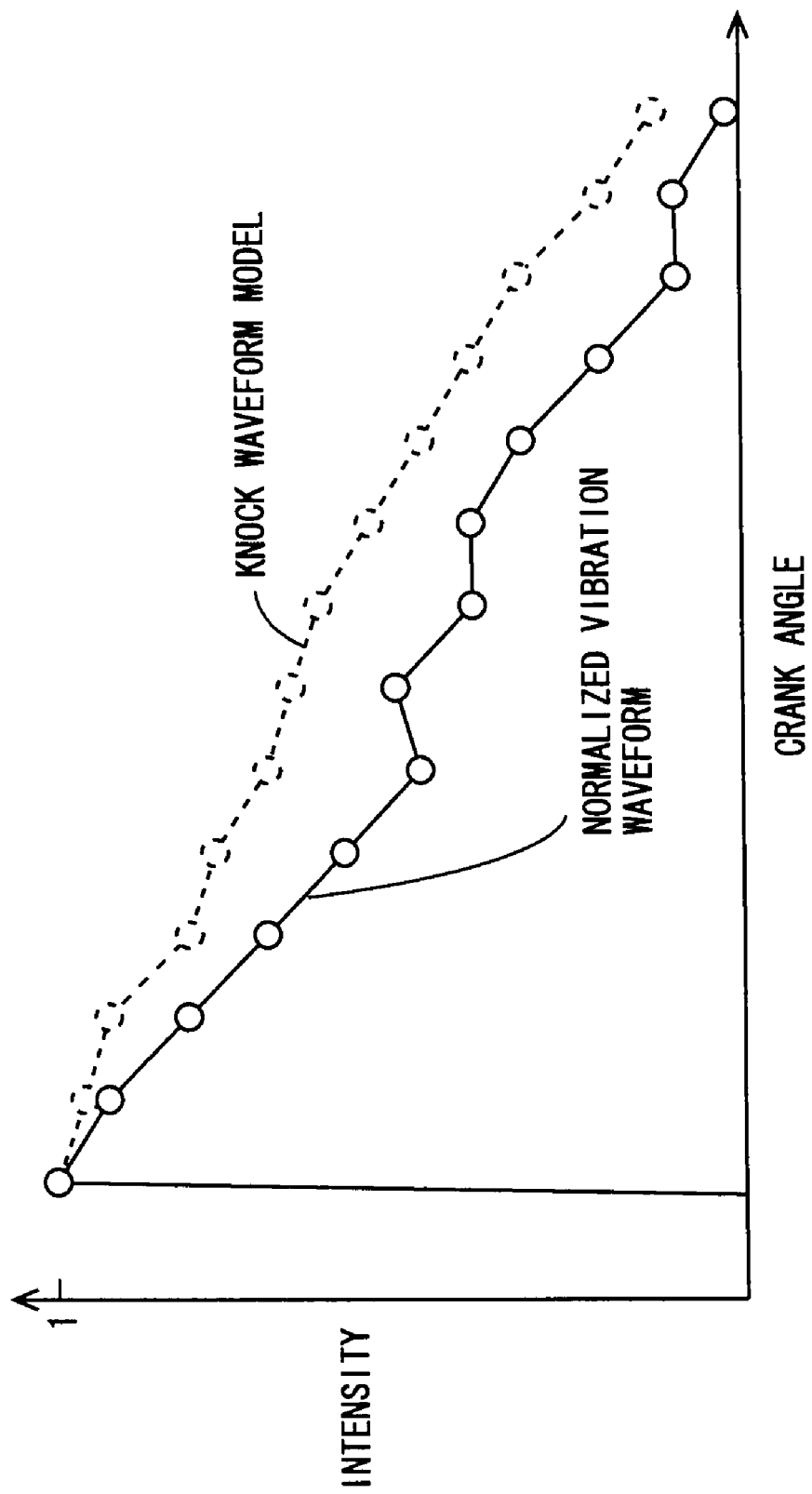
FIG. 6 shows comparison between the vibration waveform and the knock waveform model.

In the comparison between the detected waveform and the knock waveform model, a normalized waveform and the knock waveform model are compared, as shown in FIG. 6. Here, normalization refers, for instance, to representation of vibration intensity by a dimensionless number of 0 to 1, by dividing each of the integrated values by the maximum integrated value of the detected vibration waveform. The method of normalization is not limited thereto.

In the present embodiment, engine ECU 200 calculates a coefficient of correlation K, which is a value related to a deviation between the normalized vibration waveform and the knock waveform model. The timing at which vibration intensity of the normalized vibration waveform peaks is matched with a timing at which the vibration intensity of knock waveform model peaks, and in this state absolute value of deviation (amount of displacement) between the normalized vibration waveform and the waveform model is calculated crank angle by crank angle (at every 5 degrees), whereby the coefficient of correlation K is calculated.

When we represent the absolute value of deviation between the normalized vibration waveform and the knock waveform model for each crank angle by $\Delta S$ (I) (wherein I is a natural number) and the vibration intensity of knock waveform model integrated by the crank angle (i.e., the area of knock waveform model) by S, then the coefficient of correlation K is calculated by an equation $K=(S-\Sigma\Delta S(I))/S$, where $\Sigma\Delta S$ (I) represents a sum of $\Delta S$ (I)s. In the present embodiment, coefficient of correlation K is calculated as a larger value when the signal waveform has a shape closer to the knock waveform model. Therefore, if the vibration waveform includes vibration waveform caused not by knocking, the calculated coefficient of correlation K comes to have a smaller value. Note that the coefficient of correlation K may be calculated by a different method.

Further, engine ECU 200 calculates a knock intensity N based on the maximum value (peak value) among the integrated values. When we represent the maximum value of the integrated values by P and the value representing the magnitude of vibration of engine 100 while engine 100 is not knocking by BGL (Back Ground Level), the nock intensity N is calculated by the equation N=P/BGL. The maximum value P of the integrated value for calculating knock intensity N is subjected to logarithmic conversion. Note that the knock intensity N may be calculated by a different method.

The value BGL is calculated by subtracting, in the frequency distribution of intensity value LOG(V), which will be described later, a product of standard deviation σ and a coefficient (for example, "1") from the median V(50). BGL may be calculated by a different method, and BGL may be stored in ROM 202.

In the present embodiment, engine ECU 200 compares the calculated knock intensity N with the determination value V(J) stored in SRAM 204, and further compares the detected waveform with the stored knock waveform model, and determines for every one ignition cycle whether knock has occurred in engine 100 or not.

As shown in FIG. 7, the determination value V(J) is stored as a map, for each of the ranges divided by the state of operation using engine speed NE and intake air amount KL as parameters. In the present embodiment, nine ranges are provided for each cylinder, by the division in accordance with low speed (NE<NE(1)), middle speed (NE(1)≦NE<NE(2)), high speed (NE(2)≦NE), low burden (KL<KL(1)), middle burden (KL(1)≦KL<KL(2)) and high burden (KL(2)≦KL). The number of ranges is not limited thereto. Further, ranges may be divided using a parameter or parameters other than the engine speed NE and intake air amount KL.

At the time of shipment of engine 100 or the vehicle, a value determined in advance through an experiment or the like is used as the determination value V(J) (initial determination value V(J) at shipment) stored in ROM 202. Dependent on variation in output values or degradation of knock sensor 300, detected intensity may possibly vary even if the vibration occurring in engine 100 is the same. In that case, it is necessary to correct the determination value V(J) and to determine whether knock has occurred or not using the determination value V(J) appropriate for the actually detected intensity.

Therefore, in the present embodiment, a knock determination level V(KD) is calculated based on a frequency distribution representing relation between an intensity value LOG(V) obtained by logarithmic conversion of intensity V and frequency (number of times, or probability) of detection of each intensity value LOG(V).

For every range defined by the engine speed NE and the intake air amount KL as parameters, the intensity value LOG(V) is calculated. The intensity V used for calculating intensity value LOG(V) is the peak value of intensity between predetermined crank angles (peak integrated value for every 5 degrees). Based on the calculated intensity value LOG(V), the median V(50) at which the frequency of intensity value LOG(V) accumulated from the minimum value attains 50% is calculated. Further, standard deviation σ of intensity value LOG(V) not larger than the median V(50) is calculated. By way of example, in the present embodiment, the median V(50) and standard deviation σ, which are approximated to the median and standard deviation calculated based on a plurality (for example, 200 cycles) of intensity values LOG(V), are calculated by the following method, cycle by cycle of ignition.

If the intensity value LOG(V) detected at present is larger than the median V(50) calculated last time, a value obtained by adding a predetermined value C(1) to the median (50) calculated last time is provided as the median V(50) this time. On the contrary, if the intensity value LOG(V) detected at present is smaller than the median V(50) calculated last time, a value obtained by subtracting a predetermined value C(2) (by way of example, the value C(2) may be the same as C(1)) from the median (50) calculated last time is provided as the median V(50) this time.

If the intensity value LOG(V) detected this time is smaller than the median V(50) calculated last time and larger than a value obtained by subtracting the standard deviation σ calculated last time from the median V(50) calculated last time, a value obtained by subtracting double a predetermined value C(3) from the standard deviation σ calculated last time is provided as the standard deviation σ this time. On the contrary, if the intensity value LOG(V) detected at present is larger than the median V(50) calculated last time, or if it is smaller than the value obtained by subtracting the standard deviation σ calculated last time from the median V(50) calculated last time, a value obtained by adding a predetermined value C(4) (by way of example, the value C(4) may be the same as C(3)) to the standard deviation a calculated last time is provided as the standard deviation σ this time. The median V(50) and the standard deviation CT may be calculated by other methods. Further, initial values of the median V(50) and the standard deviation σ may be preset values, or "0".

Using the median V(50) and the standard deviation σ, the knock determination level V(KD) is calculated. As shown in FIG. 8, a value obtained by adding a product of a coefficient U(1) (U(1) is a constant and, for example, U(1)=3) and standard deviation σ to the median V(50) is provided as the knock determination level V(KD). The knock determination level V(KD) may be calculated by a different method.

The ratio (frequency) of intensity values LOG(V) larger than the knock determination level V(KD) is determined to be the frequency of knocking, and counted as knock occupation ratio KC.

If the knock occupation ratio KC is larger than a threshold value KC(0), the determination value V(J) is corrected to be smaller by a predetermined correction amount A(1), so that frequency of retarding ignition timing increases. The corrected determination value V(J) is stored in SRAM 204.

The coefficient U(I) is a coefficient found from data and knowledge obtained through experiment or the like. The intensity value LOG(V) larger than the knock determination level when U(1)=3 is substantially equal to the intensity value LOG(V) of the ignition cycle in which knock actually occurred. A value other than "3" may be used as coefficient U(I).

If engine 100 is free of knocking, frequency distribution of intensity value LOG(V) will be a normal distribution as shown in FIG. 9, in which the maximum value V(MAX) of intensity value LOG(V) and knock determination level V(KD) match. When knock occurs, detected intensity V increases, and when the high intensity value LOG(V) is calculated, the maximum value V(MAX) becomes larger than the knock determination level V(KD) as shown in FIG. 10.

When the frequency of knocking further increases, the maximum value V(MAX) further increases as shown in FIG. 11. At this time, the median V(50) and the standard deviation σ of frequency distribution both increase. Therefore, the knock determination level V(KD) increases.

The intensity value LOG(V) smaller than the knock determination level is not determined to be the intensity value LOG(V) in the cycle in which knock has occurred and, therefore, if the knock determination level V(KD) increases, false determination of no-knocking would be made more frequently even when knocking has actually occurred.

Figure 12:
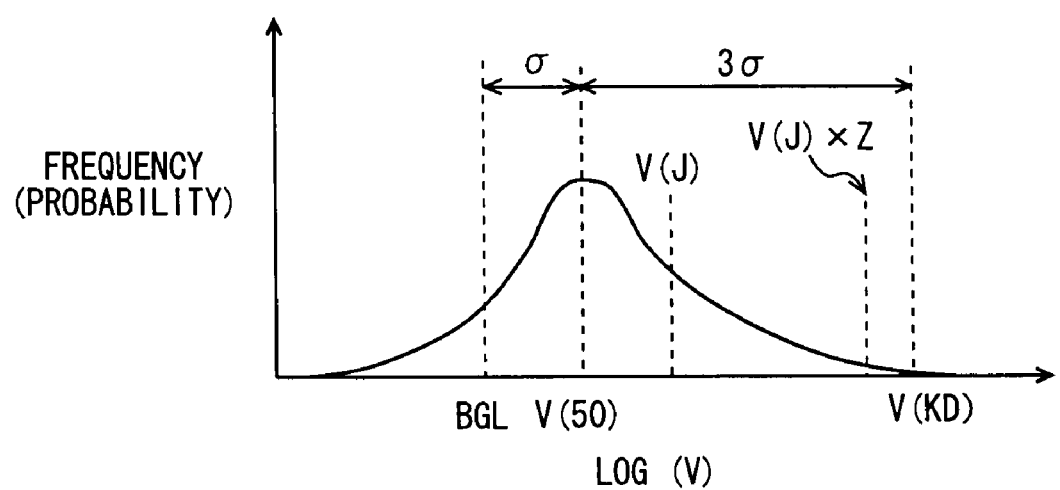
FIG. 12 is a (fifth) diagram representing frequency distribution of intensity value LOG(V).

Therefore, in the present embodiment, as shown in FIG. 12, if the knock determination level V(KD) is larger than a product of the present determination value V(J) and the coefficient Z, it is determined to be a state of frequent knocking. Here, the determination value V(J) is made smaller by a correction amount A(2), which is larger than a correction amount A(1) used when knock occupation ratio KC is larger than the threshold value KC(0). Therefore, when knock occurs frequently, ignition timing retarding adjustment is performed more frequently, so as to prevent knocking.

If determination value V(J) is too small as compared with the vibration intensity actually experienced in engine 100, frequency of determination that knock has occurred becomes unnecessarily large, though actually knock occurrence is less frequent. In such a case, ignition timing would be retarded more frequently than necessary, which is undesirable considering the output of engine 100.

Therefore, in the present embodiment, if the number of knock intensities N not lower than the determination value V(J) is not smaller than a threshold value B(1), among the knock intensities N of a plurality of predetermined number (for example, 200) of continuous ignition cycles, the determination value V(J) is increased by a correction amount A(3).

Further, if the number of knock intensities N not lower than the determination value V(J) among the knock intensities N of a plurality of predetermined number of continuous ignition cycles is not smaller than a threshold value B(2) (B(2)<B(1)) and smaller than the threshold value B(1), the determination value (J) is increased by a correction amount A(4), which is smaller than the correction amount A(3). Accordingly, the determination value V(J) can be increased quickly.

In engine 100, in addition to the vibration caused by knocking, vibration caused by seating of intake valve 116 or exhaust valve 118 may possibly occur. Further, vibration may also be caused by an operation of an injector (particularly, direct injector for directly injecting fuel to cylinder) 104 or a pump 120 feeding fuel to the injector.

Such vibrations can be detected as noise, regardless of presence/absence of knocking, that is, regardless of the magnitude of determination value V(J). Noise intensity is comparable to the vibration intensity caused by knocking.

Therefore, if all knock intensities N of a plurality of predetermined number of continuous ignition cycles are used as population, knock intensity N not lower than the determination value V(J) may possibly exist even when the determination value V(J) is not excessively small.

Therefore, if the number of knock intensities N not lower than the determination value V(J) is smaller than the threshold value B(1) and smaller than the threshold value B(2), knock intensities N of a plurality of ignition cycles satisfying the condition that the coefficient of correlation K is not lower than the threshold value K(1) (for example, K(1)=0.6), among all the knock intensities of the plurality of predetermined number of continuous ignition cycles, are used as the population.

Among the knock intensities N of the plurality of ignition cycles satisfying the condition that coefficient of correlation K is not smaller than the threshold value K(1), if the number of knock intensities N not lower than the determination value V(J) is not lower than the threshold value B(3) (B(3)<B(2)), the determination value V(J) is increased by a correction amount A(5), which is smaller than correction amount A(4).

Figure 13:
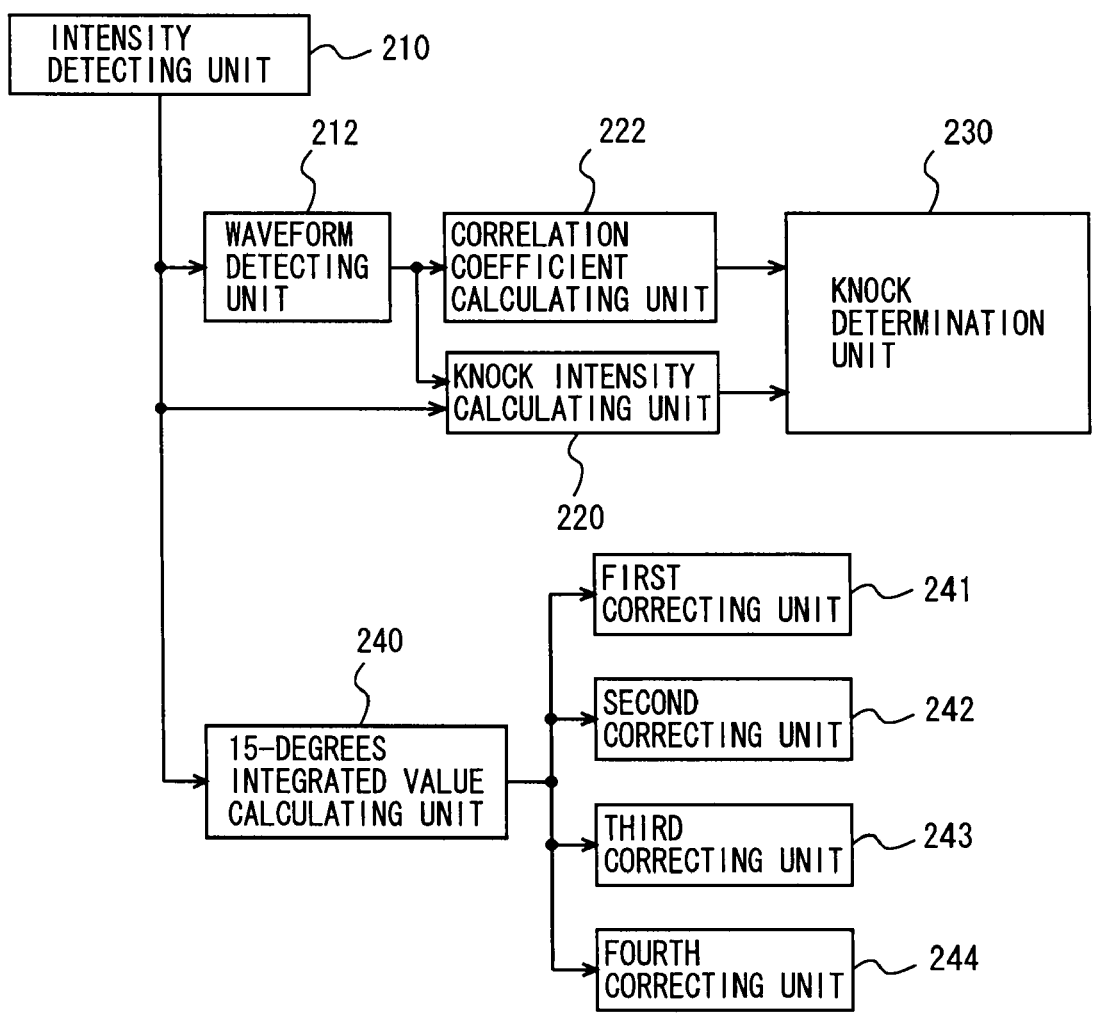
FIG. 13 is a functional block diagram of the engine ECU.

Referring to FIG. 13, functions of engine ECU 200 as a knock determination device in accordance with the present embodiment will be described. The functions of engine ECU 200 described in the following may be implemented by hardware or software.

Engine ECU 200 includes an intensity detecting unit 210, a waveform detecting unit 212, a knock intensity calculating unit 220, a correlation coefficient calculating unit 222, a knock determination unit 230, an intensity value calculating unit 240, a first correcting unit 241, a second correcting unit 242, a third correcting unit 243, and a fourth correcting unit 244.

Intensity detecting unit 210 detects intensity V of vibration in the knock detection gate, based on the signal transmitted from knock sensor 300. Waveform detecting unit 212 detects vibration waveform in the knock detection gate by integrating vibration intensities V, 5 degrees by 5 degrees of crank angle.

Knock intensity calculating unit 220 calculates the knock intensity N. Correlation coefficient calculating unit 222 calculates the coefficient of correlation K. Knock determination unit 230 determines that knock has occurred, if the knock intensity N is larger than the determination value V(J) and the coefficient of correlation K is larger than the threshold value K(0).

Intensity value calculating unit 240 calculates an intensity value LOG(V) by logarithmic transformation of intensity V. The first correcting unit 241 corrects the determination value V(J) to be smaller by the correction amount A(1), if the knock occupation ratio KC representing the ratio of intensity values LOG(V) larger than the knock determination level V(KD) is larger than the threshold value KC(0).

The second correcting unit 242 corrects the determination value V(J) to be smaller by the correction amount A(2), if the knock determination level V(KD) is larger than the product of present determination value V(J) and coefficient Z.

The third correcting unit 243 corrects the determination value V(J) to be larger by the correction amount A(3), if the number of knock intensities N not lower than the determination value V(J) is not smaller than the threshold value B(1), among the knock intensities of a plurality of predetermined number of continuous ignition cycles. Further, the third correcting unit 243 corrects the determination value V(J) to be larger by the correction amount A(4), if the number of knock intensities N not lower than the determination value V(J) is not smaller than the threshold value B(2), among the knock intensities of a plurality of predetermined number of continuous ignition cycles.

The fourth correcting unit 244 corrects the determination value V(J) to be larger by the correction amount A(S), if the number of knock intensities N not lower than the threshold value V(J) is not smaller than the threshold value B(3), among the knock intensities of the plurality of ignition cycles satisfying the condition that the coefficient of correlation K is not lower than the threshold value K(1).

Figure 14:
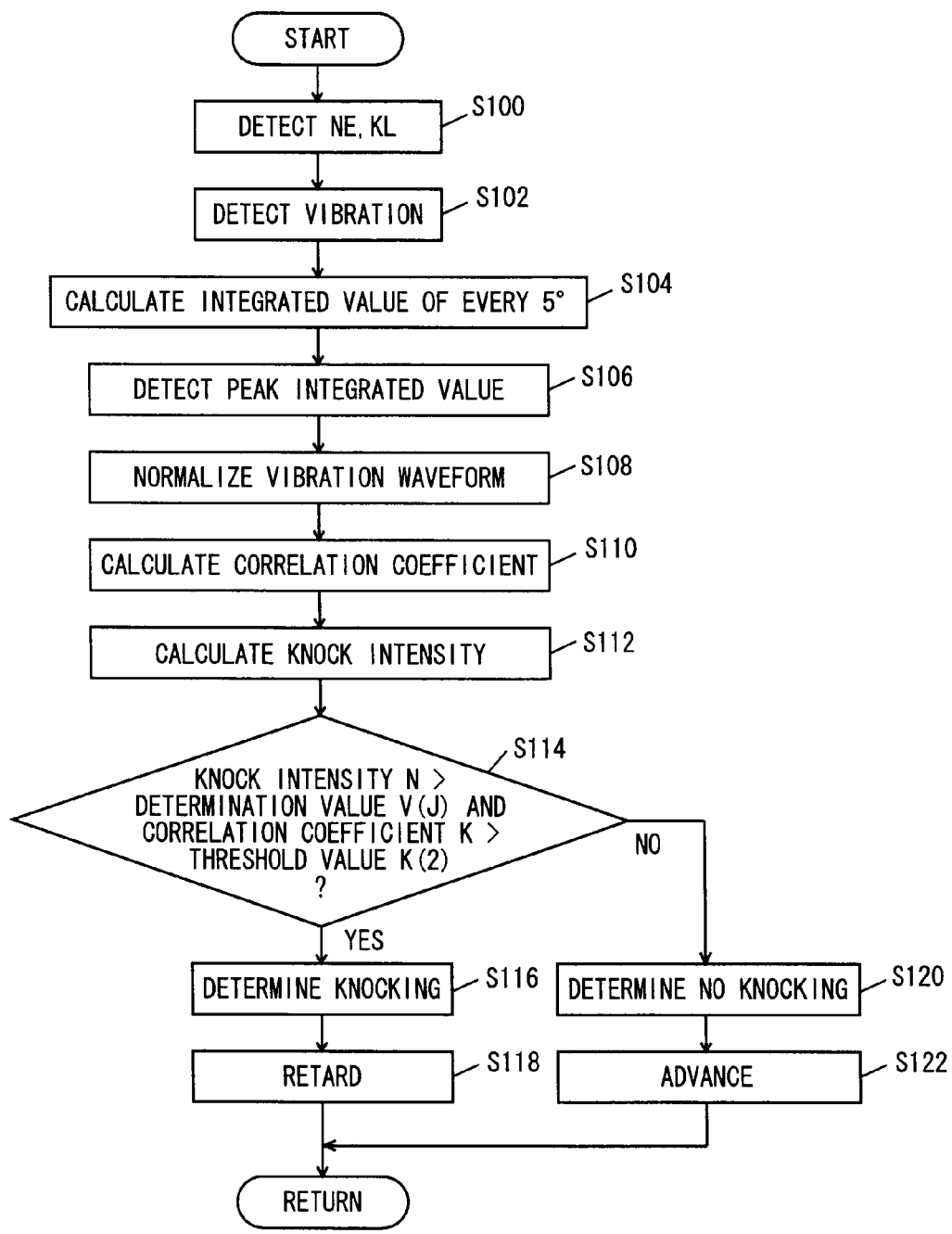
FIG. 14 is a (first) flowchart representing a control structure of a program executed by engine ECU as the knock determination device in accordance with the embodiment of the present invention.

Referring to FIG. 14, control structure of a program executed by ECU 200 as the knock determination device in accordance with the present embodiment, for controlling ignition timing by determining cycle by cycle of ignition whether knock has occurred or not, will be described.

At step (hereinafter represented as S) 100, engine ECU 200 detects engine speed NE based on the signal transmitted from crank position sensor 306 and detects amount of intake air KL based on the signal transmitted from air flow meter 314.

At S102, engine ECU 200 detects the vibration intensity of engine 100 from a signal transmitted from knock sensor 300. The vibration intensity is represented by a value of voltage output from knock sensor 300. Note that the vibration intensity may be represented by a value corresponding to the value of the voltage output from knock sensor 300. The vibration intensity is detected in a combustion stroke for an angle from a top dead center to 90° (a crank angle of 90°).

At S104, engine ECU 200 calculates the integrated value, that is, integrated value of voltage output from knock sensor 300 (representing vibration intensity), for a crank angle of every five degrees (integrated for only 5 degrees). The integrated value is calculated for the vibration of each of the first to third frequency bands A to C. Further, the integrated values of the first to third frequency bands A to C are added in correspondence with the crank angles, and the vibration waveform of engine 100 is detected.

At S106, engine ECU 200 calculates the largest integrated value (peak value P) among the integrated values of combined waveform (vibration waveform of engine 100) of the first to third frequency bands A to C.

At S108, engine ECU 200 normalizes vibration waveform of engine 100. Here, normalization refers, for instance, to representation of vibration intensity by a dimensionless number of 0 to 1, by dividing each integrated value by the calculated peak value.

At S110, engine ECU 200 calculates a coefficient of correlation K as a value related to deviation between the normalized vibration waveform and the knock waveform model. At S112, engine ECU 200 calculates knock intensity N.

At S114, engine ECU 200 determines whether knock intensity N is larger than the determination value V(J) and whether the coefficient of correlation K is larger than the threshold value K(2). If the knock intensity N is larger than V(J) and the coefficient of correlation K is larger than the threshold value K(2) (YES at S114), the process proceeds to S116. If not (NO at S114), the process proceeds to S120.

At S116, engine ECU 200 determines that knock has occurred in engine 100. At S118, engine ECU 200 retards the ignition timing. At S120, engine ECU 200 determines that knock has not occurred in engine 100. At S122, engine ECU 200 advances the ignition timing.

Figure 15:
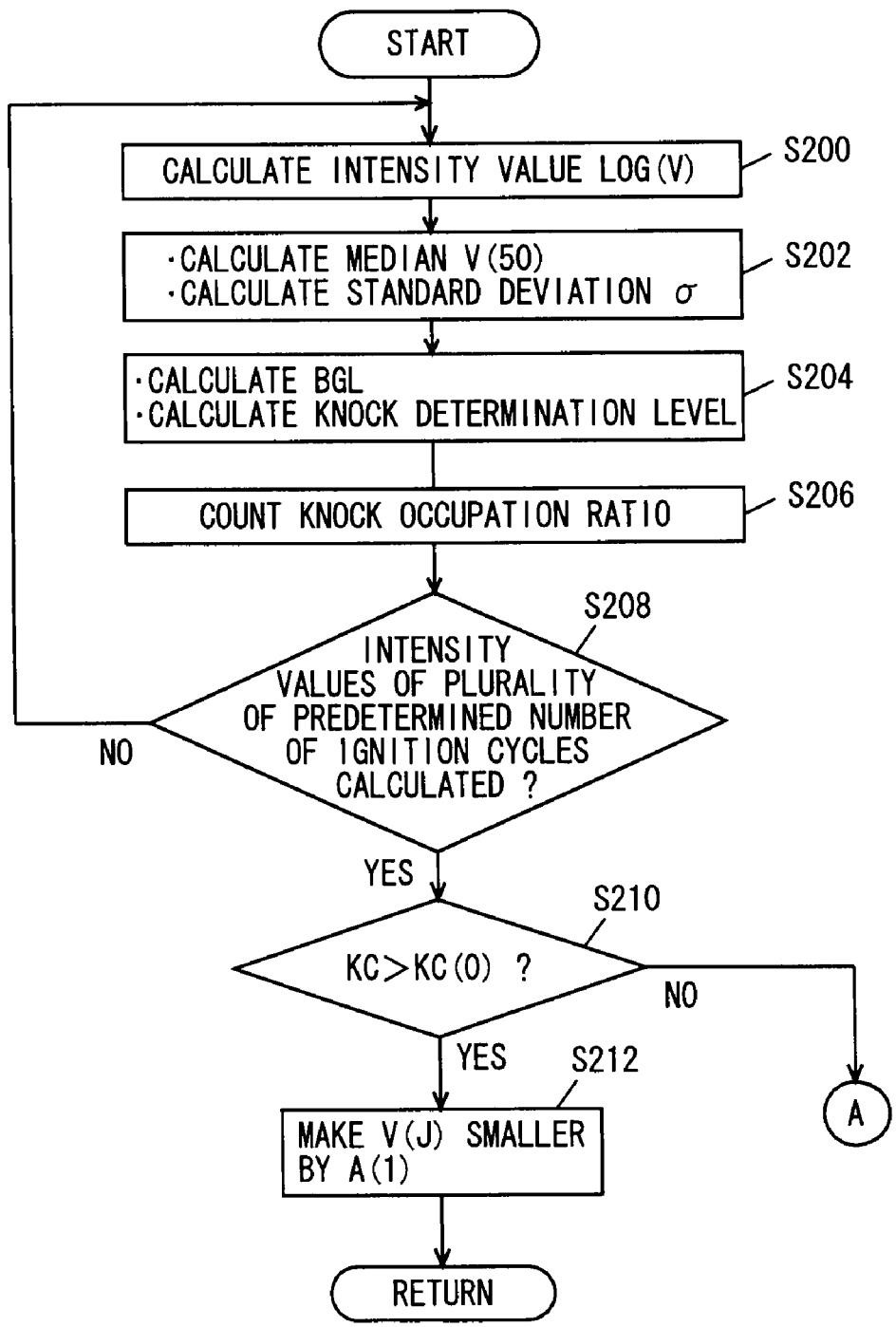
FIG. 15 is a (second) flowchart representing a control structure of a program executed by engine ECU as the knock determination device in accordance with the embodiment of the present invention.
Figure 16:
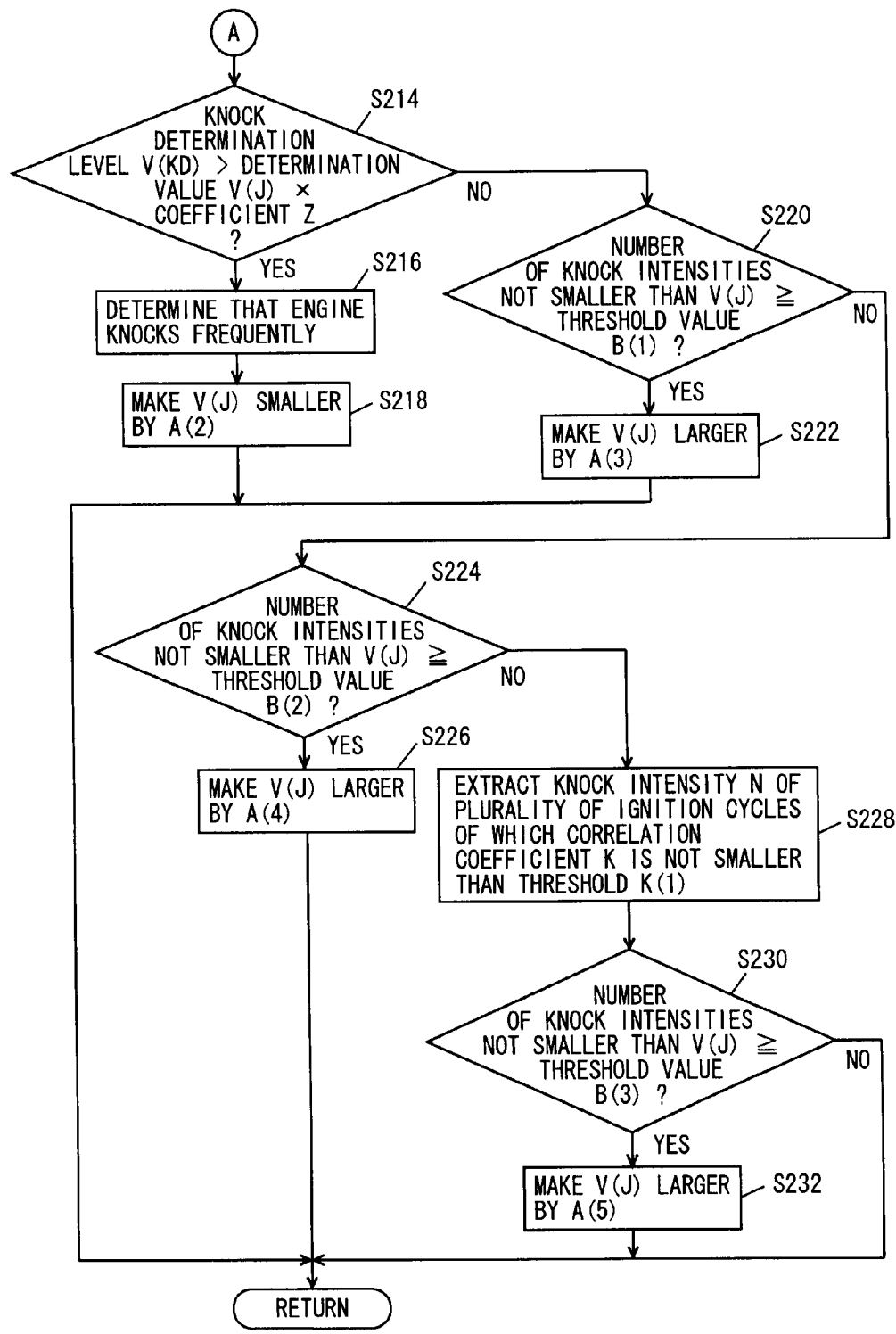
FIG. 16 is a (third) flowchart representing a control structure of a program executed by engine ECU as the knock determination device in accordance with the embodiment of the present invention.

Referring to FIGS. 15 and 16, control structure of a program executed by ECU 200 as the knock determination device in accordance with the present embodiment for correcting the determination value V(J) will be described.

At S200, engine ECU 200 calculates the intensity value LOG(V) from the intensity V detected based on the signal transmitted from knock sensor 300. Here, the intensity V is the peak value between predetermined crank angles (peak of the integrated value of every 5 degrees).

At S202, engine ECU 200 calculates a median V(50) and standard deviation a for the calculated intensity value LOG (V). Calculation of median V(50) and standard deviation a may be done every time the intensity values LOG(V) for a plurality of predetermined number of ignition cycles are extracted.

At S204, engine ECU 200 calculates BGL and knock determination level V(KD) based on the calculated median V(50) and standard deviation a.

At S206, engine ECU 200 counts the ratio of intensity values LOG(V) that are larger than the knock determination level V(KD), as the knock occupation ratio KC.

At S208, engine ECU 200 determines whether intensity values LOG(V) of a plurality of predetermined number of ignition cycles have been calculated after the determination value V(J) was corrected last time.

If intensity values LOG(V) of a plurality of predetermined number of ignition cycles have been calculated (YES at S208), the process proceeds to S210. If not (NO at S208), the process returns to S200.

At S210, engine ECU 200 determines if the knock occupation ratio KC is larger than a threshold value KC(0) or not. If the knock occupation ratio KC is larger than the threshold value KC(0) (YES at S210), the process proceeds to S212. If not (NO at S210), the process proceeds to S214.

At S212, engine ECU 200 makes the determination value V(J) smaller by the correction amount A(1).

At S214, engine ECU 200 determines whether knock determination level V(KD) is larger than the product of present determination value V(J) and coefficient Z (for example, Z=1.5). If the knock determination level V(KD) is larger than the product of the present determination value V(J) and coefficient Z (YES at S214), the process proceeds to S216. If not (NO at S214), the process proceeds to S220.

At S216, engine ECU 200 determines that engine knocks frequently. At S218, engine ECU 200 makes the determination value V(J) smaller by the correction amount A(2).

At S220, engine ECU 200 determines if the number of knock intensities N that are not lower than the determination value V(J) is not smaller than the threshold value B(1), among the knock intensity values of the plurality of predetermined number of continuous ignition cycles.

If the number of knock intensities N that are not lower than the determination value V(J) is not smaller than the threshold value B(1) (YES at S220), the process proceeds to S222. If not (NO at S222), the process proceeds to S224. At S222, engine ECU 200 makes the determination value V(J) larger by the correction amount A(3). It is noted that process steps S214 to S218 may be executed after S222.

At S224, engine ECU 200 determines if the number of knock intensities N that are not lower than the determination value V(J) is not smaller than the threshold value B(2), among the knock intensities N of the plurality of predetermined number of continuous ignition cycles. If the number of knock intensities N not lower than the determination value V(J) is not smaller than the threshold value B(2) (YES at S224), the process proceeds to S226. If not (NO at S224), the process proceeds to S228. At S226, engine ECU 200 makes the determination value V(J) larger by the correction amount A(4).

At S228, engine ECU 200 extracts knock intensities N of a plurality of ignition cycles satisfying the condition that the coefficient of correlation K is not smaller than the threshold value K(1), among the knock intensities N of the plurality of predetermined number of ignition cycles.

At S230, engine ECU 200 determines if the number of knock intensities not lower than the determination value V(J) is not smaller than the threshold value B(3) among the extracted knock intensity N.

If the number of knock intensities N not lower than the determination value V(J) is not smaller than the threshold value B(3) (YES at S230), the process proceeds to S232. If not (NO at S230), the process ends.

At S232, engine ECU 200 makes the determination value V(J) larger by the correction amount A(5). Then, the process ends.

An operation of engine ECU 200 as the knock determination device according to the present embodiment based on the above-described configuration and flowchart will be described.

While engine 100 is in operation, engine speed NE is detected based on the signal transmitted from crank position sensor 306, and the amount of intake air KL is detected based on the signal transmitted from air flow meter 314 (S100). Further, vibration intensity of engine 100 is detected based on the signal transmitted from knock sensor 300 (S102).

In a combustion stroke for a range from the top dead center to 90°, the integrated value for every five degrees is calculated for vibrations of each of the first to third frequency bands A to C (S104). The calculated 5-degrees integrated values of the first to third frequency bands A to C are added in correspondence with the crank angles, and the vibration waveform of engine 100 such as shown in FIG. 4 is detected.

As an integrated value for every five degrees is used to detect a vibration waveform, it becomes possible to avoid detection of a complicated vibration waveform having vibration intensity varying delicately. This makes it easier to compare a detected vibration waveform with the knock waveform model.

Based on the detected integrated value, the peak value P of the integrated value in the combined waveform (vibration waveform of engine 100) of first to third frequency bands A to C is calculated (S106).

The integrated value of vibration waveform of engine 100 is divided by the calculated peak value P, whereby the vibration waveform is normalized (S108). By the normalization, vibration intensity in the vibration waveform is represented by a dimensionless number of 0 to 1. Thus, the detected vibration waveform can be compared with the knock waveform model regardless of the vibration intensity. This can eliminate the necessity of storing a large number of knock waveform models corresponding to the vibration intensity and thus, facilitates preparation of the knock waveform model.

The timing at which vibration intensity becomes the highest in the normalized vibration waveform is matched with the timing at which vibration intensity becomes the highest in the knock waveform model (see FIG. 6), and in this state, the absolute value ΔS(I) of the deviation between the normalized vibration waveform and the knock waveform model for each crank angle is calculated. Based on the sum ΣΔS(I) of ΔS(I)s and the value S obtained by integrating vibration intensity of the knock waveform model for the crank angle, the coefficient of correlation K is calculated as K=(S−ΣΔS (I))/S (S110). In this manner, it becomes possible to have the degree of matching between the detected vibration waveform and the knock waveform model in numerical representation, which allows objective determination. Further, comparison between the vibration waveform and the knock waveform model allows analysis as to whether the vibration derives from knocking, based on the vibration behavior such as the attenuation tendency of vibration.

Further, by dividing the peak value P (value obtained by logarithmic transformation of peak value P) by BGL, the knock intensity N is calculated (S112). Thus, it becomes possible to analyze in grater detail whether the vibration in engine 100 is caused by knocking or not.

If the knock intensity N is larger than the determination value V(J) and the coefficient of correlation K is larger than the threshold value K(2) (YES at S114), it is determined that knock has occurred (S116), and the ignition timing is retarded (S118). Thus, occurrence of knocking is prevented.

If the knock intensity N is not larger than the determination value V(J) or the coefficient of correlation K is not larger than the threshold value K(2) (NO at S114), it is determined that knock has not occurred (S120), and the ignition timing is advanced (S122). In this manner, by comparing the knock intensity N and determination value V(J), whether knock has occurred or not is determined ignition cycle by ignition cycle, and the ignition timing is retarded or advanced accordingly.

Dependent on variation in output values or degradation of knock sensor 300, detected intensity may possibly vary even if the vibration occurring in engine 100 is the same. In that case, it is necessary to correct the determination value V(J) and to determine whether knock has occurred or not using the determination value V(J) appropriate for the actually detected intensity.

Therefore, in engine ECU 200 as the knock determination device in accordance with the present embodiment, the intensity value LOG(V) is calculated (S200). For the calculated intensity value LOG(V), the median V(50) and the standard deviation σ are calculated (S202). Based on the median V(50) and the standard deviation σ, BGL and knock determination level V(KD) are calculated (S204).

The ratio of intensity values LOG(V) larger than the knock determination level V(KD) is counted as the knock occupation ratio KC (S206).

If the intensity values LOG(V) of a plurality of predetermined number of ignition cycles have been calculated (YES at S208) and the knock occupation ratio KC is larger than the threshold value K(0) (YES at S210), possibility of knocking is considered high.

In this case, the determination value V(J) is made smaller by correction amount A(1) (S212), so that the ignition timing tends to be retarded more frequently. Thus, frequency of knocking can be decreased.

If knocking frequency becomes extremely high as described above, the detected intensity V or the intensity value LOG(V) becomes larger and, as a result, knock determination level V(KD) attains excessively high. In that case, knock occupation ratio KC could be equal to or lower than the threshold value KC(0), even when engine knocks frequently.

Therefore, if the knock determination level V(KD) is larger than the product of present determination value V(J) and coefficient Z (YES at S214), it is determined that knocks have occurred frequently (S216), and the determination value VG(J) is made smaller by the correction amount A(2) (S218). Thus, the frequency of knocking can be made smaller.

On the contrary, if the determination value V(J) is too small as compared with the vibration intensity actually experienced in engine 100, frequency of determination that knock has occurred becomes unnecessarily large, though actually knock occurrence is less frequent. In such a case, ignition timing would be retarded more frequently than necessary, which is undesirable considering the output of engine 100.

Therefore, in order to increase the determination value V(J) when the determination value V(J) is too small, whether the number of knock intensities N not lower than the determination value V(J) is not smaller than the threshold value B(1), among the knock intensities N of the plurality of predetermined number of continuous ignition cycles, is determined (S220).

If the number of knock intensities N not lower than the determination value V(J) is not smaller than the threshold value B(1) (YES at S220), the determination value V(J) is increased by the correction amount A(3).

If the number of knock intensities N not lower than the determination value V(J) is smaller than the threshold value B(1) (NO at S220) but not smaller than the threshold value B(2), which is smaller than the threshold value B(1) (YES at S224), the determination value V(J) is increased by the correction amount A(4), which is smaller than the correction amount A(3) (S226).

Therefore, unnecessary retarding of ignition timing can be prevented. Here, regardless of the magnitude of coefficient of correlation K, the knock intensity values N of predetermined number of continuous ignition cycles after correction of the determination value V(J) last time are used for comparison with the threshold value B(1) or B(2).

Therefore, as soon as the predetermined number of knock intensities N is calculated after the last correction of determination value V(J), it becomes possible to increase the determination value V(J). Thus, the determination value V(J) can be increased quickly.

On the other hand, if the number of knock intensities N not lower than the determination value V(J) is smaller than the threshold value B(1) (NO at S220) and smaller than threshold value B(2) (NO at S224), knock intensities N of a plurality of ignition cycles satisfying that the coefficient of correlation K is not smaller than the threshold K(1) are extracted, from the knock intensities N of the plurality of predetermined number of ignition cycles (S228). Thus, the knock intensity N of the ignition cycle in which knock has been detected can be excluded.

Among the extracted knock intensities N, if the number of knock intensities N not lower than the determination value V(J) is not smaller than the threshold value B(3) (YES at S230), it is considered that the determination value V(J) is slightly smaller than the value appropriate for determining presence/absence of knocking.

Here, the determination value V(J) is increased by a correction amount A(5), which is smaller than correction amount A(3) and A(5) (S232). In this manner, the determination value V(J) can be set to an appropriate value for determining whether engine knocks or not.

As described above, by the engine ECU as the knock determination device in accordance with the present embodiment, if the number of knock intensities N not lower than the determination value V(J) is not smaller than the threshold value B(1) or not smaller than the threshold value B(2), among the knock intensities N of a plurality of predetermined number of continuous ignition cycles, the determination value V(J) is increased. Therefore, as soon as the predetermined number of knock intensities N is calculated, the determination value V(J) can be increased. Thus, the determination value V(J) can be increased quickly. On the other hand, if the number of knock intensities N not lower than the determination value V(J) is smaller than the threshold value B(1) and smaller than the threshold value B(2), the knock intensities N of a plurality of ignition cycles satisfying the condition that the coefficient of correlation K is not lower than the threshold value K(1) are extracted. This enables exclusion of knock intensity N of an ignition cycle in which noise has been detected. If the number of knock intensities N not lower than the determination value V(J) is not smaller than the threshold value B(3) among the extracted knock intensities N, the determination value V(J) is increased (S232). Thus, it becomes possible to adjust the determination value V(J) to a more appropriate value for determining presence/absence of knocking.

In the present embodiment, it is determined that knock has occurred frequently if the knock determination level V(KD) is larger than the product of determination value V(J) and coefficient Z. The method of determining frequent knocking is not limited thereto. By way of example, it may be determined that knock has occurred frequently if the knock determination level V(J) is larger than the sum of the determination value V(J) and a predetermined value. Alternatively, whether or not knock has occurred frequently may be determined using, in place of the knock determination level V(KD), a value different from the knock determination level V(KD), obtained by adding a product of standard deviation σ and a coefficient to the median (50).

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

The invention claimed is:

1. A knock determination device for an internal combustion engine, comprising:
    a knock sensor detecting vibration intensity of said internal combustion engine in an interval of predetermined crank angles; and
    an operation unit; wherein
    said operation unit detects a waveform of vibration of said internal combustion engine based on the vibration intensity of said internal combustion engine,
    calculates a first value corresponding to the vibration intensity of said internal combustion engine,
    calculates, based on a result of comparison between said detected waveform and a predetermined waveform model as a reference waveform of vibration in said internal combustion engine, a second value corresponding to a difference between said detected waveform and said waveform model,
    determines whether or not knock has occurred in said internal combustion engine based on a result of comparison between said first value and a predetermined first determination value, and based on a result of comparison between said second value and a predetermined second determination value,
    corrects said first determination value if the number of first values not lower than said first determination value is not smaller than a first number, among the first values calculated in a plurality of predetermined number of continuous ignition cycles, and
    corrects said first determination value if the number of first values not lower than said first determination value is not smaller than a second number, among the first values calculated in a plurality of ignition cycles in which said second value satisfies a predetermined condition.

2. The knock determination device for an internal combustion engine according to claim 1, wherein
    if the number of first values not lower than said first determination value is not smaller than the first number among the first values calculated in said plurality of predetermined number of continuous ignition cycles, said operation unit corrects said first determination value by a correction amount larger than when the number of first values not lower than said first determination value is not smaller than the second number among the first values calculated in the plurality of ignition cycles in which said second value satisfies the predetermined condition.

3. The knock determination device for an internal combustion engine according to claim 1, wherein
    said operation unit corrects said first determination value by a larger correction amount when the number of first values not lower than said first determination value becomes larger among the first values calculated in said plurality of predetermined number of continuous ignition cycles.

4. The knock determination device for an internal combustion engine according to claim 1, wherein
    said operation unit corrects said first determination value if the number of first values not lower than said first determination value is not smaller than said second number among the first values calculated in the plurality of ignition cycles in which said second value satisfies said condition and the number of first values not lower than said first determination value is smaller than said first number among the first values calculated in said plurality of predetermined number of continuous ignition cycles.

5. The knock determination device for an internal combustion engine according to claim 1, wherein
    said operation unit
    corrects said first determination value if ratio of intensities larger than a third determination value calculated based on vibration intensity in said internal combustion engine among the vibration intensities detected in a plurality of ignition cycles is larger than a predetermined ratio,
    corrects said first determination value if the ratio of intensities larger than said third determination value among the vibration intensities detected in the plurality of ignition cycles is smaller than the predetermined ratio and it is determined that knock has occurred in said internal combustion engine, and corrects said first determination value if the number of first values not lower than said first determination value is not smaller than said first number among the first values calculated in the plurality of predetermined number of continuous ignition cycles and if the ratio of intensities larger than said third determination value among the vibration intensities detected in the plurality of ignition cycles is smaller than the predetermined ratio.

6. The knock determination device for an internal combustion engine according to claim 1, wherein
said second value is calculated to be larger if difference between said detected waveform and said waveform model is smaller, and
said condition is that it is not smaller than a predetermined value.

7. A knock determination method for an internal combustion engine, comprising the steps of:
detecting vibration intensity of said internal combustion engine in an interval of predetermined crank angles;
detecting a waveform of vibration of said internal combustion engine based on the vibration intensity of said internal combustion engine;
calculating a first value corresponding to the vibration intensity of said internal combustion engine;
calculating, based on a result of comparison between said detected waveform and a predetermined waveform model as a reference waveform of vibration in said internal combustion engine, a second value corresponding to a difference between said detected waveform and said waveform model;
determining, whether or not knock has occurred in said internal combustion engine based on a result of comparison between said first value and a predetermined first determination value, and based on a result of comparison between said second value and a predetermined second determination value;
correcting said first determination value if the number of first values not lower than said first determination value is not smaller than a first number, among the first values calculated in a plurality of predetermined number of continuous ignition cycles; and
correcting said first determination value if the number of first values not lower than said first determination value is not smaller than a second number, among the first values calculated in a plurality of ignition cycles in which said second value satisfies a predetermined condition.

8. The knock determination method for an internal combustion engine according to claim 7, wherein
said step of correcting said first determination value if the number of first values not lower than said first determination value is not smaller than said first number includes the step of correcting said first determination value by a correction amount larger than in the step of correcting said first determination value if the number of first values not lower than said first determination value is not smaller than a second number.

9. The knock determination method for an internal combustion engine according to claim 7, wherein
said step of correcting said first determination value if the number of first values not lower than said first determination value is not smaller than said first number includes the step of correcting said first determination value by a larger amount as the number of first values not lower than said first determination value becomes larger among the first values calculated in said plurality of predetermined number of continuous ignition cycles.

10. The knock determination method for an internal combustion engine according to claim 7, wherein
the step of correcting said first determination value if the number of first values not lower than said first determination value is not smaller than a second number includes the step of correcting said first determination value if the number of first values not lower than said first determination value is not smaller than said second number among the first values calculated in the plurality of ignition cycles in which said second value satisfies said condition and the number of first values not lower than said first determination value is smaller than said first number among the first values calculated in said plurality of predetermined number of continuous ignition cycles.

11. The knock determination method for an internal combustion engine according to claim 7, further comprising the steps of:
correcting said first determination value if ratio of intensities larger than a third determination value calculated based on vibration intensity in said internal combustion engine among the vibration intensities detected in a plurality of ignition cycles is larger than a predetermined ratio; and
correcting said first determination value if the ratio of intensities larger than said third determination value among the vibration intensities detected in the plurality of ignition cycles is smaller than the predetermined ratio and it is determined that knock has occurred in said internal combustion engine; wherein
said step of correcting said first determination value if the number of first values not lower than said first determination value is not smaller than a first number includes the step of correcting said first determination value if the number of first values not lower than said first determination value is not smaller than said first number among the first values calculated in the plurality of predetermined number of continuous ignition cycles and if the ratio of intensities larger than said third determination value among the vibration intensities detected in the plurality of ignition cycles is smaller than the predetermined ratio.

12. The knock determination method for an internal combustion engine according to claim 7, wherein
said second value is calculated to be larger if difference between said detected waveform and said waveform model is smaller; and
said condition is that it is not smaller than a predetermined value.

13. A knock determination device for an internal combustion engine, comprising:
means for detecting vibration intensity of said internal combustion engine in an interval of predetermined crank angles;
means for detecting a waveform of vibration of said internal combustion engine based on the vibration intensity of said internal combustion engine;
means for calculating a first value corresponding to the vibration intensity of said internal combustion engine;
means for calculating, based on a result of comparison between said detected waveform and a predetermined waveform model as a reference waveform of vibration in said internal combustion engine, a second value corresponding to a difference between said detected waveform and said waveform model;
means for determining whether or not knock has occurred in said internal combustion engine based on a result of comparison between said first value and a predetermined first determination value, and based on a result of comparison between said second value and a predetermined second determination value;

first correcting means for correcting said first determination value if the number of first values not lower than said first determination value is not smaller than a first number, among the first values calculated in a plurality of predetermined number of continuous ignition cycles; and second correcting means for correcting said first determination value if the number of first values not lower than said first determination value is not smaller than a second number, among the first values calculated in a plurality of ignition cycles in which said second value satisfies a predetermined condition.

14. The knock determination device for an internal combustion engine according to claim 13, wherein
said first correcting means includes means for correcting said first determination value by a larger correction amount than said second correcting means.

15. The knock determination device for an internal combustion engine according to claim 13, wherein
said first correcting means includes means for correcting said first determination value by a larger amount as the number of first values not lower than said first determination value becomes larger among the first values calculated in said plurality of predetermined number of continuous ignition cycles.

16. The knock determination device for an internal combustion engine according to claim 13, wherein
said second correcting means includes means for correcting said first determination value if the number of first values not lower than said first determination value is not smaller than said second number among the first values calculated in the plurality of ignition cycles in which said second value satisfies said condition and the number of first values not lower than said first determination value is smaller than said first number among the first values calculated in said plurality of predetermined number of continuous ignition cycles.

17. The knock determination device for an internal combustion engine according to claim 13, further comprising:
third correcting means for correcting said first determination value if ratio of intensities larger than a third determination value calculated based on vibration intensity in said internal combustion engine among the vibration intensities detected in a plurality of ignition cycles is larger than a predetermined ratio; and fourth correcting means for correcting said first determination value if the ratio of intensities larger than said third determination value among the vibration intensities detected in the plurality of ignition cycles is smaller than the predetermined ratio and it is determined that knock has occurred in said internal combustion engine; wherein said first correcting means includes means for correcting said first determination value if the number of first values not lower than said first determination value is not smaller than said first number among the first values calculated in the plurality of predetermined number of continuous ignition cycles and if the ratio of intensities larger than said third determination value among the vibration intensities detected in the plurality of ignition cycles is smaller than the predetermined ratio.

18. The knock determination device for an internal combustion engine according to claim 13, wherein
said second value is calculated to be larger if difference between said detected waveform and said waveform model is smaller; and
said condition is that it is not smaller than a predetermined value.

* * * * *